United States Patent [19]
Kohler

[11] 3,852,749
[45] Dec. 3, 1974

[54] RADIOLOCATION SYSTEM

[75] Inventor: Karl Kohler, Heimerdingen, Germany

[73] Assignee: International Standard Electric Corporation, New York, N.Y.

[22] Filed: Jan. 24, 1973

[21] Appl. No.: 326,513

[30] Foreign Application Priority Data
Jan. 25, 1972  Germany............................ 2203442

[52] U.S. Cl.......... 343/102 R, 343/108 R, 343/115, 343/120
[51] Int. Cl............................................. G01s 1/08
[58] Field of Search..... 343/102 R, 115, 120, 108 R

[56] References Cited
UNITED STATES PATENTS
| | | | |
|---|---|---|---|
| 3,634,862 | 1/1972 | Hiscox et al. | 343/108 R |
| 3,665,468 | 5/1972 | Fleming et al. | 343/102 |
| 3,704,465 | 11/1972 | Masak et al. | 343/102 |

*Primary Examiner*—Maynard R. Wilbur
*Assistant Examiner*—S. C. Buczinski
*Attorney, Agent, or Firm*—William T. O'Neil

[57] ABSTRACT

A radiolocation system having a ground based linear array. The elements of that array radiate in-phase RF pulses successively, one at a time. An airborne receiver station processes the signals received from the ground antenna in a manner to simulate scan as would be produced by a physically scanned ground originated beam. The airborne equipment can select the effective angle and equivalent angular rate of the simulated "scan." In the said receiver, the magnitude and phase of each pulse are determined and added vectorially. The absolute value of the vector sum is equal to the equivalent amplitude of a group pattern in a scanning ground system. Changing the phase of the angles represented by adding a phase offset in the receiver sequentially permits simulated scan and angle determination without an actual ground generated beam scan.

9 Claims, 17 Drawing Figures

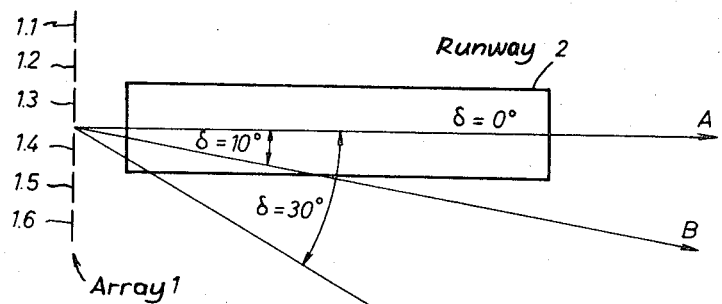
Fig.1
$\delta = 0°$ ; $\alpha = 0°$
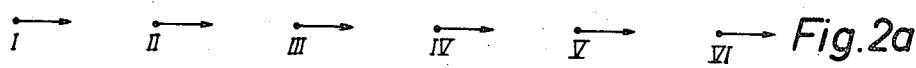
Fig.2a
Fig.2b
$\delta = 10°$ ; $\alpha = 0°$
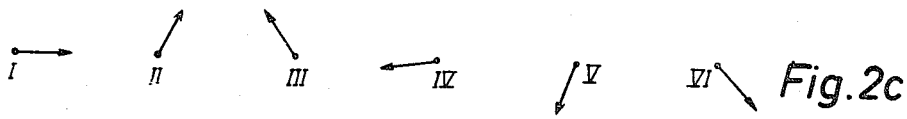
Fig.2c
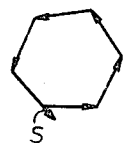
Fig.2d
$\delta = 30°$ ; $\alpha = 0°$
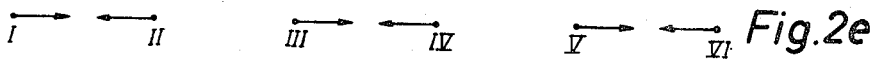
Fig.2e
• S
Fig.2f $\delta = 10°$ ; $\alpha = 0°$ $\delta = 10°$ ; $\alpha = -30°$ $\delta = 10°$ ; $\alpha = -62,5°$ $\delta = 10°$ ; $\alpha = -90°$

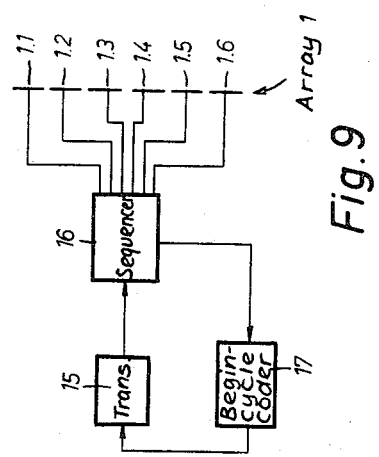
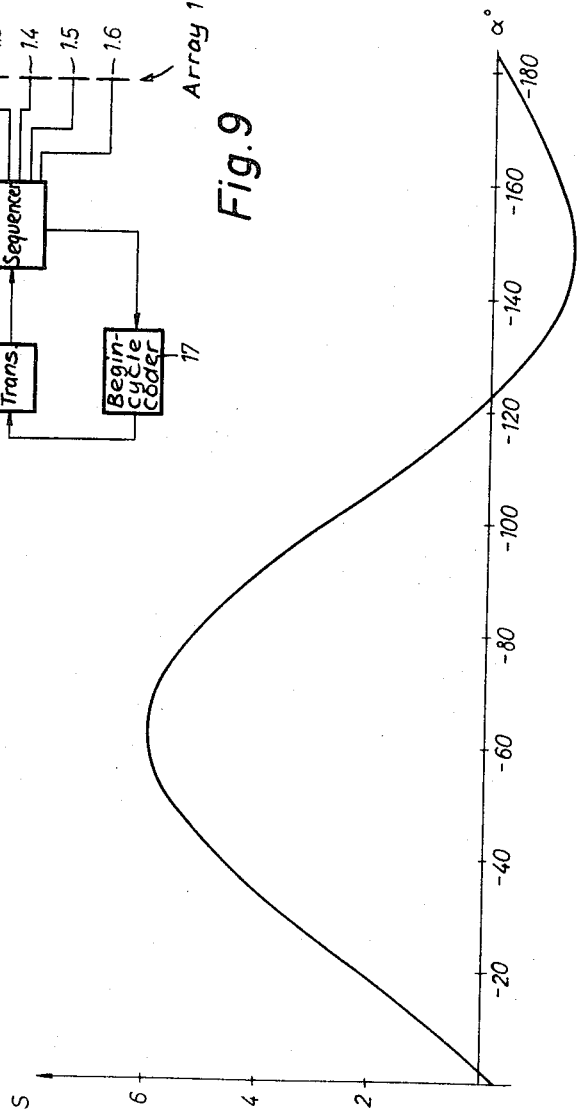

3,852,749

RADIOLOCATION SYSTEM

CROSS-REFERENCES TO RELATED APPLICATIONS

This application is filed under the provisions of 35 U.S.C. 119 with claim for the benefit of the filing of an application covering the same invention filed Jan. 25, 1972, Ser. No. 22 03 442, in Germany.

BACKGROUND OF THE INVENTION

1. Field of the Invention

The present invention relates to radiolocation systems, and particularly to an air-derived angle determining device therefor, employing an associated commutated ground array.

2. Description of the Prior Art

Position fixing and landing systems in which the radiation pattern of a directional antenna is electronically scanned, i.e., continuously moved, are well known in this art. Such a radiation pattern is sometimes called a "group pattern" because it is generated by an array (a plurality of simultaneously radiating radiators). In such arrangements, it is necessary to continuously transmit the actual angle of the maximum of the group pattern from the ground station to the airborne station because no navigational information can be derived from the amplitude of a field-strength measurement alone. In the known systems, the scanning angle and the scanning velocity of the group pattern cannot be influenced from the airborne station and, therefore, are the same for all users (all airborne receiving stations). Also, in the airborne station, it is very difficult to eliminate errors caused by multipath propagation. A typical arrangement of the prior art type with scanning interferometer beams is described in U.S. Pat. No. 3,159,837.

SUMMARY OF THE INVENTION

It is the general object of the present invention to avoid the disadvantages of the known systems and provide a completely novel system which basically differs from the prior art in its mode of operation. The invention is characterized in that, in the ground station, $n$-like and equally spaced radiators of a linear antenna array are commutated to cyclically and sequentially radiate pulses of an RF oscillation are measured in sequence for each pulse from each radiator, relative to one of the pulses from a predetermined radiator. These measured values are vectorially added, and the absolute value of the sum is determined, said value corresponding to the equivalent amplitude of the field strength which a group pattern with main lobe would produce and radiate perpendicularly with respect to the linear antenna array and as received at the airborne station. Thereafter, the phase of the first pulse is changed by a predetermined angle and the phases of the succeeding pulses are changed by that multiple of said angle which corresponds to the respective ordinal number of the said succeeding pulses. The phase change is carried out several times, each time with different values of the (offset) angle, and for each value of said angle, the changed measured values are vectorially added. The absolute value of the sum is determined and stored together with the value of the associated angle and the vector sum with the greater absolute value is determined. The azimuth (or elevation) angle is derived from the associated value of the said angle, with the greatest absolute value corresponding to that field-strength amplitude which the group pattern having its main lobe directed to the receiver, would produce.

The system of the invention, for the first time, offers a possibility of obtaining, by suitable signal processing in the receiver, the same information which the receiver could derive from a scanned group pattern, without having to move a radiation pattern in space. In addition, each airborne receiver can uniquely select the "scanning speed" and "scanning angle." The ground equipment is therefore very simple and can be constructed for long term stability and reliability, since it need not scan, but only commutates the elements in the manner well known in Doppler Navigation systems such as described in U.S. Pat. Nos. 3,626,419 and 3,670,338, for example.

U.S. Pat. No. 3,601,684 is also of interest for prior art commutation systems.

In U.S. Pat. application Ser. No. 220,982, filed Jan. 26, 1972, a system is described which also uses element commutation in the array of a system involving phase additions at airborne receiving stations. It is to be understood that the present invention does not depend on the Doppler principle and does not undertake to evaluate Doppler frequencies simulated by ground array commutation or actual from airborne station velocities. The present system improves upon and extends the techniques of the said U.S. application, Ser. No. 220,982.

The manner in which the present invention is constructed and operates to provide the advantages of simplicity, high accuracy, immunity to multipath propogation and individualized air-controlled scan will be understood as this description proceeds.

BRIEF DESCRIPTION OF THE DRAWINGS

FIG. 1 is a plan view of a runway, a ground array and three arbitrary airborne receiving station locations.

FIG. 2a through FIG. 2f shows typical vector diagrams for the commutated signals from the array of FIG. 1 derived at the corresponding airborne stations.

FIG. 6 is a continuous beam scanning vector summation absolute value curve.

FIG. 9 is a diagram of a typical ground array radiator commutation arrangement.

DESCRIPTION OF THE PREFERRED EMBODIMENT

Figure 3:
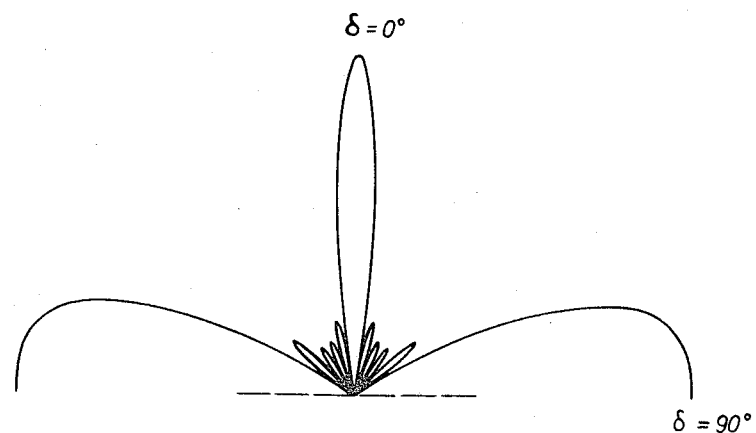
FIG. 3 is a typical array beam pattern or a "virtual" pattern for explanation purposes.

With reference to FIGS. 1 to 6, the mode of operation of the system will be explained for azimuth measurement, which is a typical application of the invention.

Referring specifically to FIG. 1, a runway 2 is shown in a plan view. At one end is a horizontal antenna array 1 comprising plural radiators 1.1 to 1.6, spaced along the array length. For this explanation, the spacing between the radiators (radiating elements) illustrated as dipoles, is equal to the operating wavelength λ. Three approach angles or receiver positions A ($\delta = 0°$), B ($\delta = 10°$), and C ($\delta = 30°$) are shown. Looking ahead to FIG. 9, the radiators 1.1 through 1.6 are sequentially connected (commutated) from a transmitter 15, and each radiator transmits a pulse containing an RF oscillation, the amplitude and phase of which are the same for all radiators. Prior to each radiation cycle, a pulse train is radiated over one radiator (from sequencer 16) arbitrarily 1.1, to identify the beginning of the cycle for the benefit of the airborne receiver. The sequencing of energy from 16 proceeds through radiators 1.1, 1.2, 1.3, 1.4, 1.5 and 1.6, in order. A "begin-cycle" code generator 17 marks the beginning of each commutation cycle by means of a coded pulse group transmission (identification code).

In the airborne receiver, the pulses are processed at the rate at which the radiators of the linear antenna array are commutated; beginning when the said pulse train appears; it being thereby determined in the receiver that the pulse from ground radiator 1.1 follows next, so that an unambiguous assignment of the received pulses to the radiators is obtained. If the pulse received from radiator 1.1 is chosen as the reference pulse, the phases $\psi_2$ to $\psi_6$ of the pulses received from radiators 1.2 to 1.6 can be measured relative to the phase $\psi_1$ of the reference pulse with the aid of an indicating device provided in the receiver. Likewise, the amplitudes $A_2$ to $A_6$ of the received pulses can be measured relative to the amplitude of the reference pulse. For the following explanation, it is assumed that there are no interferences. Then, the amplitudes $A_2$ to $A_6$ all assume the value of the amplitude $A_1$. For this explanation, it is assumed that amplitude value is 1.

Since each pulse can be unambiguously assigned to one radiator, a number couple (valve pair), consisting of amplitude and phase, is thus obtained for each pulse in the receiver.

Each number couple constitutes a complex number or a vector. Since the pulse coming from radiator 1.1 is the reference pulse, its number couple has always the phase 0 for all receiver positions. The relative phases of the number couples for the pulses from the other radiators depend on the corresponding receiver positions.

For reasons of clarity of explanation, vector representation will be used in the following to explain the theory of the invention.

In each of FIGS. 2a, 2c and 2e, the vectors for the respective receiver positions A, B and C of FIG. 1 are illustrated. The Roman numerals indicate the serial number of a corresponding radiator from which the received pulse was radiated. That is, Roman I corresponds to radiator 1.1., Roman II to 1.2, etc.

If (for sake of explanation only) the radiators of the linear antenna array of FIG. 1 were caused to radiate simultaneously and with equal phase and amplitude, a real (group) radiation pattern shown in FIG. 3 would be obtained in space. The main lobe of this group pattern lies in the direction $\delta = 0°$. Since the radiator spacing is chosen large, i.e., $d = \lambda$, grating lobes are produced in the directions $\delta = +90°$ and $\delta = -90°$. They can be eliminated according to known theory if $d$ is reduced. However, since the radiators actually radiate one after the other, this group pattern never exists in space, only the pattern of, in each case, one corresponding radiator exists. From the successively received pulses, and the single-pattern vectors determined therefrom, the receiver can nevertheless determine the discrete field strength of the real group pattern which is associated with its position, namely by forming the absolute value of the sum of the vectors of a scanning cycle. The receiver therefore contains a device which adds the vectors and determines the absolute value of the vector sum. That factual situation forms a very important aspect of the present invention and its understanding is essential to further understanding of the invention, since it forms the basis of simulated "scan" effected uniquely from each airborne receiving position.

In each of FIGS. 2b, 2d and 2f, the vector addition is shown, the vector sum being designated S.

To a receiver in position A ($\delta = 0°$), all pulses must travel the same distance, and since the RF signal within each pulse was radiated in phase, they must arrive in phase. All vectors therefore have the phase value 0. These vectors are illustrated individually in FIG. 2a and as they add, in phase, to the absolute value of $S=6$ they are as shown in FIG. 2b.

The vectors and their summation for the position B ($\delta = 10°$) are shown in FIGS. 2c and 2d, respectively. Since the pulses, radiated from different radiators, travel different distances to the receiver in that case, the respective phases on arrival at B are different from each other, and the vectors have different directions. The respective phases are shifted by the value $2\pi d/\lambda \sin \delta$, i.e., for $\delta = 10°$ and $d = \lambda$ by 62.5° as depicted in FIG. 2c. The absolute value of the vector sum in this case, is then $S = 0.2$, see FIG. 2d.

FIG. 2e shows the vectors measured for the receiver position C ($\delta = 30°$). Here, the vectors are rotated by 180° from radiator to radiator. The absolute value $S=0$ of this vector sum is indicated by a dot in FIG. 2f.

If a vector sum $S$ were thus determined for each azimuth $\delta$ by vector addition, the absolute values of the vector sums for all angles $\delta$, plotted against $\delta$, would yield a curve which will hereinafter be referred to as a "virtual pattern." This term "virtual" expresses the idea that this pattern does not actually exist in space. It is, however, identical to the real group pattern of FIG. 3, which (as hereinabove indicated) is obtained if the radiators of the linear antenna array of FIG. 1 are fed simultaneously and with equal energy of equal amplitude and phase.

Figure 4:
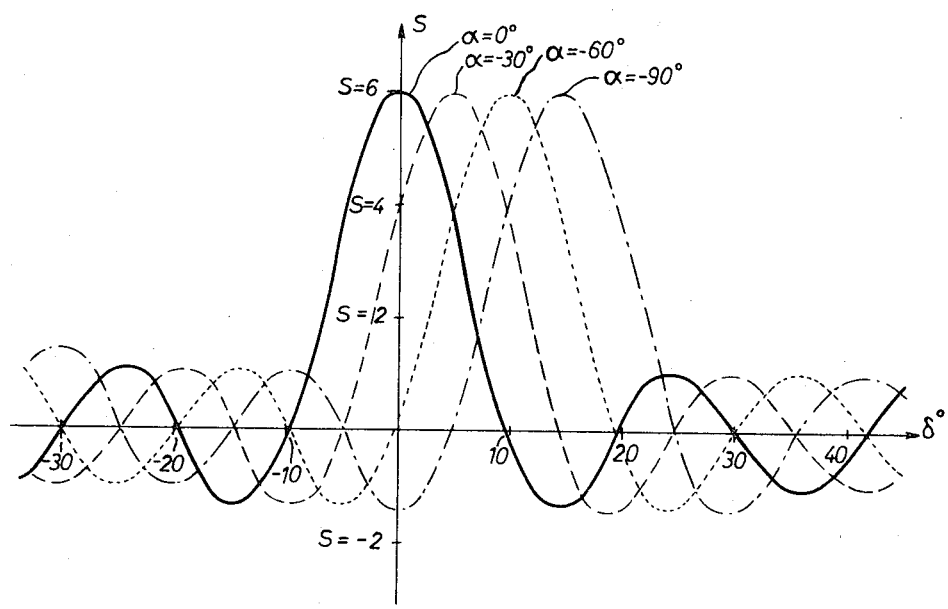
FIG. 4 is a group of real or virtual beam patterns in rectilinear coordinates illustrating real and virtual pattern rotation.
Figure 5A:
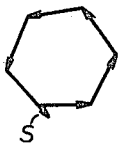
FIGS. 5a to 5d are vector diagrams for summation of received signals at one airborne station illustrating $\alpha$ variation.
Figure 5B:
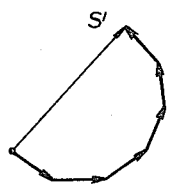
Figure 5C:
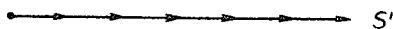
Figure 5D:
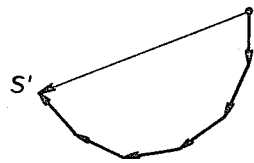

The said real group pattern and also the virtual pattern in rectangular coordinates is the $\alpha = 0°$ curve of FIG. 4. Again, if the radiators of the linear antenna array of FIG. 1 were fed simultaneously, with equal amplitude and with phases changed by $\nu \alpha$ ($\nu = 1 \ldots n$; $\alpha$ = constant angle value), a real group pattern rotated by an angle $\delta$ with respect to the group pattern of FIG. 4 would be obtained in space. This angle is obtained from the equation $$\delta = \arcsin \alpha°/360 \cdot (d/\lambda) \quad (1)$$

Because of the sequential connection of the radiators, this rotated group pattern does not exist in space.

A rotated virtual pattern is, however, conceivably produced in a manner similar to the unrotated virtual radiation pattern.

FIG. 4 shows, in rectangular coordinates, the real group patterns or virtual patterns for 30°, 60° and 90°. As can be seen, a rotation by about 5° corresponds to an angle $\alpha = -30°$, a rotation by about 10° corresponds to an angle $\alpha = -60°$, etc.

If, in the group pattern, the angle $\alpha$ is changed between $-180°$ and $+180°$ in steps of 6° for each scanning cycle, a rotation of the group pattern in steps of 1° between $\delta = -30°$ and $\delta = +30°$ is obtained, i.e., the group pattern is scanned between these two values of $\delta$. Such a scan may take place cyclically in one direction only or in both directions.

The same applies analogously to the virtual pattern. In that case, one may speak of a "scanned virtual pattern."

If the main lobe of the scanned group pattern or scanned virtual pattern rises in the direction of the aircraft, the latter's receiver determines the maximum field strength, and the azimuth $\delta$ can be calculated from the value of $\alpha$.

It will now be shown how the azimuth $\delta$ is obtained in the airborne station without any change in the operation of the linear antenna array of FIG. 1. To this end, the measured phases of the received pulses are changed according to the equation $$\psi_\nu' = \psi_\nu + \nu\alpha, \qquad \text{Equation (2)}$$

where $\psi$ is the measured phase, $\psi'$ is the changed phase, and $\alpha$ is the constant angular value for one cycle, with $\nu$ changing from 1 to $n$. For each additional cycle, $\alpha$ is increased or decreased by an appropriately equal value, i.e., $\alpha$ is the phase increment.

In a system utilizing these concepts, the absolute value of the vector sum $S'$ is determined for each cycle and stored together with the associated value of $\alpha$. When $\alpha$ has passed through all predetermined values, the maximum absolute value is determined. From the associated value $\alpha$, the azimuth $\delta$ can be calculated according to Equation (1) above. The receiver contains the devices necessary for these operations. If the absolute values of the vector sums for the receiver position B ($\delta=10°$) are plotted as a function of $\alpha$, the curve of FIG. 6 is obtained, which results from FIG. 4 if all virtual patterns are thought of as being drawn between $\alpha = 0°$ and $\alpha = -180°$ and if the respective value of the ordinate for $\delta = 10°$ is taken. For the virtual patterns drawn, one obtains $S' = -0.2529$ at $\alpha = 0°$;
$S' = 3.5413$ at $\alpha = -30°$;
$S' = 5.982$ at $\alpha = -60°$;
$S' = 4.1728$ at $\alpha = 90°$, in accordance with the vectors and vector sums shown in FIGS. 5a to 5d. Exactly the same curve as that shown in FIG. 6 would be obtained for the field-strength distribution in the receiver if the aforementioned real group pattern (beam) were physically scanned past the receiver.

From the curve of FIG. 6 it can be seen that the maximum lies at $\alpha = 62.5$, which corresponds to $\delta = 10°$, i.e., using the system in accordance with the invention, the receiver provides the accurate value of the azimuth in accordance with changes in the measured values.

The mode of operation of the receiver can also be conceived as follows: With each new value of $\alpha$, the virtual point originally located on the virtual pattern for $\delta = 0°$ and associated with the receiving direction shifts to the corresponding virtual point of the rotated virtual pattern, i.e., the field strength is determined which would be present if the pattern had been rotated by the value of $\delta$ corresponding to the respective $\alpha$.

If the shift of the virtual point is performed cyclically within the whole range of values of $\alpha$, the receiver supplies the pilot with the same information as received from a continuously scanned real group pattern. Hence, with the system in accordance with the invention, beam scanning may be said to be simulated discretely in each receiver.

Hereinafter, a preferred embodiment of the invention will be described with reference to the figures. In the discussion of the real group pattern of the linear array of FIG. 1 with reference to FIGS. 2 to 5 and 9, it was assumed that the radiators are fed in phase. If the array of radiators were (hypothetically) divided into two halves and if the radiators of one half were fed in phase and those of the other half in phase opposition, a split, real group pattern with two equally large main lobes and a zero between these lobes would be produced (interferometer pattern), which could be scanned like the single-lobe pattern. Such a double-lobe pattern is known from satellite and radar engineering, where it is used for tracking. U.S. Pat. No. 3,159,837 shows such an arrangement. It has the advantage that the minimum between the two main lobes is sharper and therefore easier to determine accurately than the maximum at value of a single main lobe.

Figure 7:
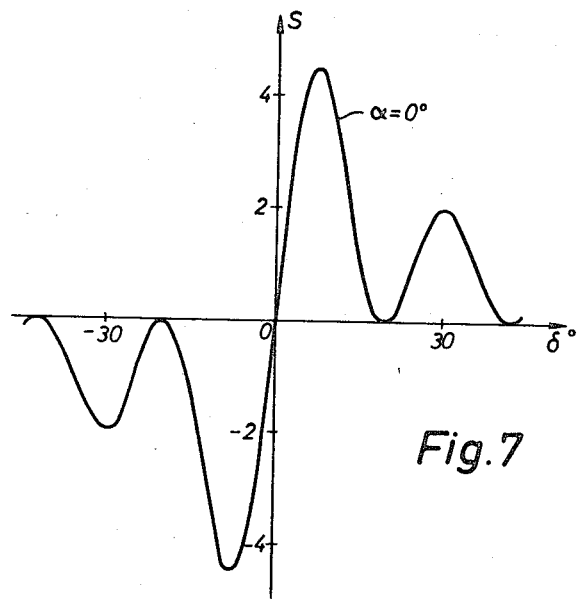
FIG. 7 is an interferometer pattern version of FIG. 4 for $\alpha = 0$.

This method and effect can also be simulated in the receiver. To this end, the linear antenna array 1 in the ground station is fed according to FIG. 1. In the airborne station, the measured phases of the pulses received from half the linear antenna array are processed as already described, while the measured phases of the pulses received from the other half of the linear antenna array are processed with a 180° phase shift. The 180° phase shift can be accomplished by simple inversion of the amplitudes. Further processing takes place as described in connection with FIGS. 2 to 5. The interferometer group pattern or virtual pattern for $\alpha = 0$ is illustrated in FIG. 7. If this pattern is scanned and if the values are taken as described in connection with FIG. 6, a curve is obtained which has a zero between two maxima. This zero is now detected instead of the maximum of the curve of FIG. 6. The value of $\delta$ which is associated with this zero or null is the azimuth sought.

When simulating both the beam-scanning method and the tracking method, it is advantageous to shift the virtual point several times within the whole range of angle $\alpha$, only for searching. After the azimuth has been determined, the virtual point is shifted within a small range corresponding to a width of 3 dB on both sides of the maximum or minimum of the real group pattern. With beam scanning, the receiver is then located in the main lobe, so to speak, or at least close by it, and draws the main lobe along. Thus, the main lobe always passes (so to speak) over the receiver; and each time a new azimuth measurement is carried out. In contrast with "beam scanning," this mode of operation is referred to as "tracking."

As already mentioned hereinbefore, the pattern of FIG. 3 has two grating lobes at $\delta = -90°$ and at $\delta = +90°$;

to suppress them and to prevent new grating lobes from appearing during scanning, $d$ is preferably made smaller than $\lambda/2$. A reduction of the remaining side lobes can be achieved if the radiators are fed from the center toward the sides with decreasing amplitudes (amplitude tapering). In the invention, too, this measure may be applied for feeding the linear (ground) antenna array. It can, however, also be simulated in the receiver, by tapering the measured amplitudes of the received pulses rather than tapering ground transmissions over the array.

Figure 8:
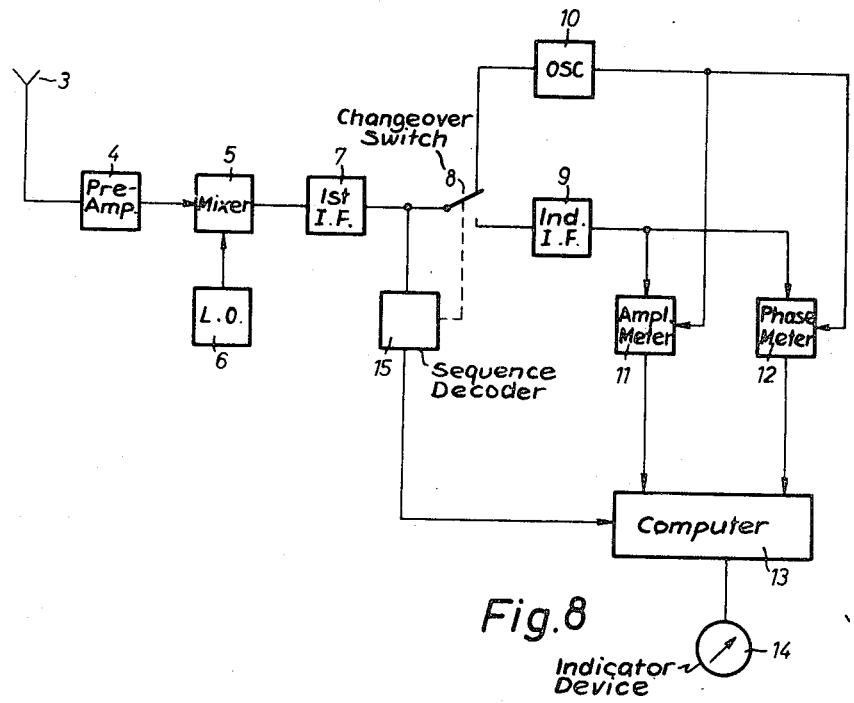
FIG. 8 is a block diagram of airborne instrumentation in accordance with the present invention.

Next, is a description of the block diagram of the receiver of FIG. 8. The RF pulses are received from an antenna 3; from there, they are applied through a tunable preamplifier 4 to the mixer 5, to whose other input is applied an RF oscillation from a local oscillator 6. The output of the mixer 5 is connected to a first IF unit 7. This unit is followed by a changeover switch 8, which, in the position shown, connects the first IF unit to an oscillator 10. If the changeover switch 8 is in the other position, the first IF unit is connected to a second IF unit 9, to whose output are connected an amplitude meter 11 and a phase meter 12. The output of oscillator 10 is connected to the second inputs of the amplitude meter 11 and of the phase meter 12. The outputs of the meters 11 and 12 are connected to a computer 13, whose output is connected to an indicator for azimuth or elevation. The said computer includes memory elements.

Also connected to the output of the first IF unit 7 is a sequence decoder 15 for recognizing the pulse train and for actuating the changeover switch 8 and controlling the computer 13. When the device 15 recognizes the pulse train, it sends a signal to the computer 13 and places the changeover switch into the position shown, so that the subsequent pulse from the first radiator is applied to the highly stable and accurate oscillator 10, and synchronizes the latter with respect to amplitude and phase. Thus oscillator 10 is much like a coherent oscillator in a coherent pulse Doppler Radar system.

After the first pulse, the changeover switch 8 is changed to the alternative position so that the succeeding pulses are applied through the second IF unit 9 to meters 11 and 12. The phase and the amplitude of the output signal of oscillator 10 are therefore the measured quantities of the first pulse and serve as reference quantities for the measurement of the phases and amplitudes of the pulses from the second to the $n$th radiator. The amplitude and phase meters are known and will, therefore, not be explained here in detail. They can be any of several analog or digital devices with registers or memories applicable to data corresponding to each commutated ground radiator.

The phase values $\psi_\nu$ and the amplitude values $A_\nu$ ($\nu=1 \ldots n$) are stored in the storage of the computer or in a separate storage. The read-in is controlled by a counter (which may be part of the circuitry of computer 13) which is advanced at the same rate as the rate of radiator commutation of the linear antenna array and, when the pulse train appears, is restored to its initial position.

From the amplitude values $A_\nu$ and the phase values $\psi_\nu$, the computer now calculates the vectors $Z_\nu$ according to the equation $$Z_\nu = A_\nu \cdot \exp(i\psi_\nu).$$

(3)

where $i^2 = -1$.

The vectors $Z_\nu$ are added, and the absolute value $S$ is formed for each value $\alpha(\alpha \min < \alpha < \alpha \max)$ according to the equation $$S = \left| \sum_{\nu=1}^{n} I_\nu \exp(i\nu\alpha) \cdot Z_\nu \right|$$

Equation (4)

and stored together with the associated value. In that equation, $I$ is a set of numerical values which are computed, for example, according to the equation $$I_\nu = 1 + 0.5 \cos((\nu - \tfrac{1}{2} - n/2) 2\pi/n)$$

(5)

In the case of unchanged amplitudes, $I_\nu = 1$. Thereafter, the greatest of the several values is determined, and the azimuth or elevation is calculated according to Equation (1).

The circuit described with reference to FIG. 8 requires a very fast computer because all arithmetical operations must take place between successive receiving cycles. Operating conditions permitting, some receiving cycles may be omitted and a slower computer may be employed. In a computer with several arithmetic units, the absolute values of all sums can also be computed in a parallel manner. The instrumentation of the computer function is according to known techniques based on the foregoing functional information.

The storage of the measured values is not an absolute necessity. Instead, the measured values of a receiving cycle may be used for each value of the angle $\alpha$. In that case, 50 receiving cycles are necessary for 50 different values of the angle $\alpha$, for example.

The receiver may, of course, also be realized without a computer. The manner in which the receiver of FIG. 8 must be modified for this purpose will now be explained supposing that the measured values are not stored.

The switch 8, the oscillator 10, the amplitude meter 11, the phase meter 12, and the computer 13 are unnecessary. The first IF unit 7 is directly connected to the second IF unit. Successively connected to the output of the second IF unit are: a phase-changing device, an amplitude-changing device, several converter stages, and a filter, at whose output the curve of FIG. 6 appears if, by means of a control unit, switched on by the pulse train, $\nu$ is changed with each pulse of a receiving cycle and $\alpha$ is changed with each receiving cycle. The sums of the individual vectors and the sums of the different values of $\alpha$ are formed with the filter. The determination of the maximum sum and of the angle from the value of $\alpha$ associated with the maximum sum is carried out as described in connection with FIG. 8.

If it is desired that the navigation system be used not by any aircraft, the sequence of connection of the radiators of the linear antenna array 1 may be changed in accordance with a predetermined code. Then, the sequence according to the ordinal number is restored in the receiver, which is pre-programmed with the code information.

What is claimed is:

1. In a radio navigation system for determining at least one angle in a plane of a remote receiving station with respect to a reference angle in said plane established at a ground station, said ground station including a linear array antenna having a plurality of elements energized cyclically and sequentially from a transmitter through a commutator arrangement to transmit RF oscillations from said elements sequentially, the combination comprising:

first means within said remote receiving station responsive to said ground transmitted RF oscillation pulses for measuring the phase and amplitude of said RF oscillations discretely for each pulse received from each of said elements of said ground station antenna with respect to a predetermined one of said elements;

second means for vectorially adding said measured phases and amplitudes and for determining the absolute value of the sum thereof over a cycle of said commutator arrangement;

third means associated with said first means for modifying the phase of the RF oscillations of each received pulse corresponding to the transmitting time of one of said commutated elements by a predetermined phase angle offset value multiplied by the ordinal number of the corresponding element commutated at the time, said phase offset value being varied for each of a predetermined number of commutation cycles of said ground antenna array, said second means thereby producing a corresponding plurality of said absolute values each corresponding to a cycle of said commutation;

and fourth means responsive to said plurality of absolute values to determine the point of inflection in the series of them and the value of said offset angle corresponding thereto, said corresponding offset angle value being indicative of said angle in a plane.

2. Apparatus according to claim 1 in which said point of inflection in the series of said absolute values is the maximum among said values.

3. Apparatus according to claim 1 including means for transmitting an identification code at the beginning of said cycles of commutation, whereby said airborne receiving station can unambiguously associate pulses of said RF oscillations with corresponding ones of said elements in said ground antenna array.

4. The invention defined in claim 3 further defined in that said plane is the azimuth plane, and said reference angle in said plane established at said ground station is a desired predetermined navigational course.

5. The invention defined in claim 3 including means by which said phase offset is changed within predetermined extreme values during determinations of each new value of said angle in a plane, the range of variation of said phase offset being determined within said receiving station.

6. Apparatus according to claim 3 in which said receiving station includes means for applying a 180° phase shift to received pulses from one predetermined half of said elements, said means being responsive to said identification code to select said predetermined half of said elements, thereby to produce an effect comparable to generation of an interferometer beam having a full point between two maximum lobes from said ground array, and said inflection point is said null.

7. Apparatus according to claim 3 in which said receiving station includes means for applying a 180° phase shift to received pulses from one predetermined half of said elements, said means being responsive to said identification code to select said predetermined half of said elements, thereby to produce an effect comparable to generation of an interferometer beam having a null point between two maximum lobes from said ground array, and said inflection point is said null.

8. Apparatus according to claim 5 in which said extreme values of said phase offset are the angles of the equivalent 3db points of a hypothetical beam which would be formed by said ground array antenna if operated as a phased array with all elements contemporaneously energized.

9. Apparatus according to claim 3 in which said plane is the azimuth plane, said reference angle in said plane is the bearing angle of the centerline of a runway, and said remote receiving station comprises the receiver of said system on an aircraft, whereby said system acts as a terminal area navigational localizer for landing approach.

* * * * *